United States Patent [19]

Dyball

[11] 4,217,433
[45] Aug. 12, 1980

[54] DIETHYLENE GLYCOL BIS(ALLYL CARBONATE) COMPOSITIONS CONTAINING CROSSLINKABLE COPOLYMERS

[75] Inventor: Christopher J. Dyball, Amherst, N.Y.

[73] Assignee: Pennwalt Corporation, Philadelphia, Pa.

[21] Appl. No.: 63,231

[22] Filed: Aug. 3, 1979

[51] Int. Cl.$^2$ ............................................. C08L 23/00
[52] U.S. Cl. ................................... 525/277; 351/159; 525/263; 525/265
[58] Field of Search ..................... 525/277, 263, 265

[56] References Cited

U.S. PATENT DOCUMENTS

| 4,059,616 | 11/1977 | Lewis et al. | 526/66 |
| 4,125,695 | 11/1978 | Kamath | 526/73 |
| 4,139,578 | 2/1979 | Baughman et al. | 525/37 |

FOREIGN PATENT DOCUMENTS 748303  4/1956  United Kingdom ..................... 525/277

Primary Examiner—J. Ziegler

[57] ABSTRACT

When an acrylic monomer such as methyl methacrylate is copolymerized with an allyl monomer such as allyl methacrylate whereby the resulting copolymer has active pendant allyl groups, this copolymer is then crosslinked with diethylene glycol bis (allyl carbonate) monomer (called ADC). The resulting product has considerable reduction in shrinkage while maintaining optical clarity and is useful as lenses.

9 Claims, No Drawings

DIETHYLENE GLYCOL BIS(ALLYL CARBONATE) COMPOSITIONS CONTAINING CROSSLINKABLE COPOLYMERS

BACKGROUND OF THE INVENTION

This invention relates to thermosetting casting compositions in which shrinkage is reduced by polymeric additives, while maintaining optical clarity.

It is well known that when monomers are polymerized, a volume reduction occurs. This shrinkage causes changes in dimensions, internal stresses in the cast article, cracking and/or separation from the mold wall, yielding surfaces of inadequate smoothness. The volume shrinkage can be reduced by two methods: either the monomer can be prepolymerized to low conversion before charging to the molds, or a 'syrup' can be prepared by dissolving a previously prepared polymer in the monomer to be cast. Preparing the syrup is the preferred method since it is inherently simpler and economically more attractive. It is to this method that the present invention relates.

It is well known in the art that thermoplastic additives incorporated into unsaturated polyester resins, reduce shrinkage on curing of these resins. (Fritz M. Wright—New "No Shrink" Polyester Resin for BMC, SMC and Wet Moulding—Paper 12A, 27th Annual Conference, Proceedings—Reinforced Plastics/Composites Institute (1972). These additives function by phase separation from the resin matrix and the creation of microvoids. The resultant cured system is opaque. The present invention provides compositions in which shrinkage upon curing is reduced, but at the same time, optical clarity is maintained. This is important in the casting of monomers such as diethylene glycol bis (allyl carbonate) (ADC) which are used in optical and glazing applications.

Unsaturated thermoplastic materials have been prepared previously (U.S. Pat. No. 4,059,616). However, the anionic polymerization techniques used often imparted a slight discoloration to the polymer. Such colorations are unacceptable for use in the present invention. The thermoplastic additives used in the compositions of the present invention are prepared by free radical polymerization which yields completely colorless polymers. The above U.S. patent states that free radical polymerizations do not yield useful polymers.

U.S. Pat. No. 4,139,578 teaches the use of unsaturated polyesters, in conjunction with a second monomer as shrinkage reducing additives for ADC. It is an object of the present invention to bring about a reduction in shrinkage by the use of a copolymer alone.

STATEMENT OF INVENTION

The present invention is directed to:

A. A composition consisting essentially of 25 to 99 percent by weight of diethylene glycol bis (allyl carbonate) monomer, and
1 to 75 percent by weight of a copolymer having a molecular weight of 1,000 to 100,000 prepared by reacting
  (i) at least one allyl ester, substituted allyl ester, N-allyl substituted amide or N-N-diallyl substituted amide, of an $\alpha$-$\beta$ unsaturated carboxylic or dicarboxylic acid; or an allyl substituted monovinyl aromatic compound.
  (ii) at least one lower alkyl methacrylate, optionally together with a minor amount of one or more vinyl or vinylidene monomers which are polymerizable by a free radical mechanism.
B. A process for the preparation of a casting comprising curing the composition A.
C. A casting prepared by the process of B wherein the casting is optically clear and has reduced shrinkage.

DETAILED DESCRIPTION

The desirable polymeric additives are multi component copolymers containing units of a monomer of the type;

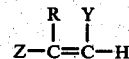

where Z is

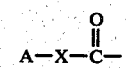

or A-R$_4$ where R$_4$ is aryl of 6 to 15 carbons.

When Z is A-R$_4$, Y is hydrogen and R is hydrogen or CH$_3$—;

When Z is

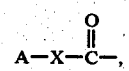

Y is hydrogen or

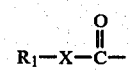

and R is hydrogen, CH$_3$—, or

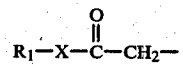

where A is

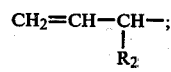

R$_2$ is hydrogen or CH$_3$—;
X is —O— or

R$_3$ is A, hydrogen, alkyl of 1 to 10 carbons, aryl of 6 to 12 carbons, cycloalkyl of 3 to 12 carbons ar aralkyl of 7 to 15 carbons;
R$_1$ is A or R$_3$ with the proviso that when Y is

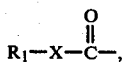

R is hydrogen and when R is

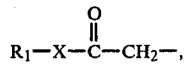

Y is hydrogen.

Representative examples of the monomer are: allyl methacrylate, allyl itaconate, diallyl itaconate, allyl acrylamide, diallyl acrylamide, allyl maleate, diallyl maleate, and 4 allyl styrene.

Most preferably the monomer should by allyl methacrylate; the allyl monomer should comprise 0.1–100 mole% of the copolymer and in a preferred embodiment 0.1–25 mole%.

The above allyl monomer is copolymerized with at least one lower alkyl methacrylate, optionally together with a minor amount of one or more monomers selected from: esters of acrylic and methacrylic acids: vinyl aromatic monomers such as styrene, vinyl toluene, p-methoxystyrene and partially or fully hydrogenated or halogenated derivatives of vinyl aromatics (e.g. vinyl cyclohexane; chloro, fluoro and bromo styrenes etc.) Other operable vinyl monomers include vinyl chloride, vinylidene chloride, tetrafluoroethylene; unsaturated carboxylic acids such as acrylic and methacrylic acids; vinyl esters such as vinyl acetate, vinyl propionate, vinyl stearate etc.; diene monomers such as isoprene, butadiene, chloroprene, etc.; anhydrides or esters of unsaturated carboxylic acids such as maleic anhydride; nitriles such as acrylonitrile and methacrylonitrile. Preferably the monomer should be an ester of acrylic or methacrylic acid. Most preferably methyl methacrylate.

The above monomer or monomers should comprise from 0–99.9 mole% of the copolymer, preferably 75–99.9 mole%. The monomers comprising the copolymer which will be used as a polymeric additive in the monomer to be cast, will be selected with reference to the glass transition temperature, refractive index, etc. of the copolymer. The copolymer selection will depend on the desired properties of the final casting.

Preparation of the Copolymer

It should be understood that a copolymer is defined as a polymer made from two or more different monomers. An allyl containing monomer from the first group is copolymerized with one or more monomers from the second group. The monomer combination is chosen such that the vinyl unsaturation in the monomer containing the allyl group has similar reactivity to that (those) from the second group. Hence it is possible to prepare random copolymers with pendant unreacted allyl groups, the composition of which copolymers does not change with conversion.

The copolymerization can be carried out by bulk, solution, suspension or emulsion polymerization. In a preferred embodiment, solution polymerization is employed. Suitable solvents include, but are not limited to: aromatics such as benzene, toluene, xylene, chlorobenzene, etc.; chlorinated hydrocarbons such as chloroform, methylene chloride, etc.; ethers such as dioxan, tetrahydrofuran, etc. The solvent is selected for a particular monomer combination, taking into account its boiling point, etc. In a preferred embodiment toluene is the solvent.

One or more free radical type initiators is used. The reactivity of such an initiator is generally defined in terms of its ten hour half-life temperature. This is the temperature at which one half of the peroxide originally present will decompose in ten hours (see for example Encyclopedia of Polymer Technology, page 826 published by Wiley & Sons, 1968). Half-life measurements are solvent and concentration dependant. Half-lives are generally measured in a solvent such as benzene, toluene, trichloroethylene, etc. at a concentration of about 0.05 to 0.2 M (see Encyclopedia of Polymer Technology reference supra). The initiators suitable for use in the present invention have ten hour half-lives between 20° and 130° C.; suitable examples include: di-isobutyryl peroxide, lauroyl peroxide, t-butyl peroxy 2 ethyl hexanoate, di-sec butyl peroxydicarbonate, di-t-butyl peroxy propane, dicumyl peroxide, 2-t-butyl-azo-2-cyano-4-methoxy-4-methyl pentane or acetyl cyclohexyl sulphonyl peroxide. Preferably, the ten hour half-life temperature of the initiator(s) should be between 30° and 100° C. Activated systems where decomposition of a peroxide is brought about at or near room temperature by means of a promoter are also usable. Such systems include hydroperoxides or ketone peroxides promoted by cobalt salts such as cobalt napthenate and/or amines such as dimethyl aniline. The latter promoter can also be used with diacyl peroxides such as benzoyl peroxide and peroxyesters such as t-butyl perbenzoate.

Low molecular weight copolymers are preferred in the compositions of the present invention. Low molecular weight copolymers can be dissolved in a monomer at higher concentrations than polymers of higher molecular weight without producing unacceptably high solution viscosities. Preferably the molecular weight of the copolymer ($\overline{M}_v$) should be between 1,000 and 100,000. Most preferably between 1,000 and 50,000. The acceptable viscosity of the polymer in monomer solution is limited by the necessity of transferring it to molds for the curing reaction. The addition of saturated low molecular weight copolymers to the resin could result in undesirable plasticization but the unsaturation present in the copolymers used in the present invention means that they co-react into the resin network.

When using a given initiator system, the molecular weight of a polymer produced can be reduced by one of several methods:

(i) an increase in the initiator concentration; preferably the starting concentration of initiator should be between 0.1 and 25 wt% on monomer, must preferably between 1 and 15 wt%.

(ii) an increase in the reaction temperature. Preferred temperatures are between 20° and 150° C., most preferably between 40° and 120° C. The polymerization may be isothermal or subject to a temperature profile examples of which are described in U.S. Pat. No. 4,125,695.

(iii) dilution of the monomer with solvent, preferred solvent to monomer ratios range from 0.1:1 to 10:1, most preferably from 0.25:1 to 5:1.

(iv) use of chain transfer agents. Examples include thiols such as n-butane thiol and chlorinated hydrocarbons such as carbon tetrachloride. Chain transfer constants for many chain transfer agents with many monomers are listed in the Polymer Handbook described earlier. From a knowledge of this chain transfer constants, one skilled in the art would be able to select a concentration and addition scheme for a given chain transfer constant in order to control molecular weight.

(v) addition of a monomer which has a high chain transfer constant to monomer, thus leading to non-degradative chain transfer.

Methods i, ii, iii and v were employed to control molecular weights of the copolymers. Method iv can be used, but the common chain transfer agents often impart unpleasant odors to the copolymer. In the preparation of the copolymer either batch type or continuous polymerization techniques can be used. The copolymer can be isolated by any of the normal methods such as: spray drying, freeze drying, flash off, precipitation from a non solvent, etc. and then redissolved in the monomer to be cast. Alternatively the copolymer solution can be added directly to a monomer and the solvent stripped off.

In choosing a copolymer for use with a particular monomer, many criteria must be considered.

(i) The copolymer must be soluble in the monomer.
(ii) The copolymer must co-react with the resin to give optically clear material.
(iii) The refractive index of the copolymer containing casting may be different from that of the pure casting. If the refractive indices cannot be matched, the two compositions cannot be used interchangeably in optical molds such as those used for eyeglass lenses.
(iv) Castings are often dyed. The rate of dye uptake of the copolymer containing material must be considered.
(v) The addition of the copolymer to the composition may affect the hardness of the casting.

Compositions of the invention are obtained by dissolving the copolymers described above in one or more monomers selected from: diallyl compounds such as diethylene glycol bis(allyl carbonate), diallyl esters of dicarboxylic acids diallyl adipate, diallyl sebacate and diallyl phthalate.

The novel compositions consist of 1–75 wt% copolymer and 25–99 wt% monomer. In the preferred composition of this invention, a copolymer of MMA and AMA (0.5–25 mole% AMA) is dissolved in ADC such that the final compositions consist of 60–99 wt% ADC with the remainder being the copolymer.

Castings are prepared from these compositions by bulk polymerization in an appropriate mold. One or more free radical initiators are used, the type and concentration of which will depend on the monomer in question and the dimensions of the casting. Initiators having ten hour half-lives between 20° and 125° C. are usable.

In the preferred embodiment, when the monomer is ADC, the preferred initiators are peroxydicarbonates such as di-isopropyl peroxydicarbonate or sec. butyl peroxydicarbonate. Alternatively, benzoyl peroxide is also suitable. Initiator concentrations from 1–5 wt% on monomer are preferred.

The polymerization temperature will again depend on the monomer, initiator and dimensions of the casting. When the monomer is ADC and the initiator is a peroxydicarbonate, the temperature range will be between 50° and 110° C. The polymerization may be isothermal, but in the preferred embodiment a temperature profile from about 50° C. to about 110° C. would be used. The duration of this heating cycle would be from 2–40 hours depending on the dimensions of the casting.

EXAMPLE 1

Preparation of methyl methacrylate (MMA)-allyl methacrylate (AMA) copolymers and a PMMA sample as a blank The polymers were prepared by solution polymerization in toluene. The polymerization mixtures were charged into ampoules which were purged with nitrogen before sealing with a gas-oxygen torch. Polymerization was effected by immersing the sealed tubes in an oil bath at 70° C. for 6 hours. Polymers were isolated by opening the tubes and pouring the solution slowly into a large excess of cooled heptane. The precipitated polymers were filtered off and dried under vacuum. Table 1 details the polymerization solutions used, together with other relevant data.

Table 1

| Polymer # | 1 | 2 | 3 | 4 |
|---|---|---|---|---|
| MMA (g) | 20.0 | 19.9 | 19.9 | 18.0 |
| AMA (g) | — | 0.1 | 1.0 | 2.0 |
| toluene (ml) | 80 | 80 | 80 | 80 |
| t-butyl peroxypivalate (g)* | 4.0 | 4.0 | 4.0 | 4.0 |
| conversion % | — | 99.0 | 98.5 | 97.0 |
| $\bar{M}_v$ | — | ~8,700 | — | — |

*Used as a 75% solution in mineral spirits (Lupersol 11) made by Lucidol Division Pennwalt Corp.

EXAMPLE 2

Use of the polymers from Example 1 as shrinkage reducing additives in ADC

The polymer to be tested (4 g) was dissolved in ADC (16 g). The initiators di-sec. butyl peroxydicarbonate (0.411 g) plus 1,1,-bis (t-butyl peroxy) 3,3,5-trimethyl cyclohexane (0.202 g) were mixed into each solution.

Casting molds were formed from two sheets of tempered glass separated by a flexible silicone rubber gasket. The molds were held together by spring binder clips. The casting solutions were introduced into the molds through the gasket by means of a syringe, a second syringe needle was used to allow displaced air to escape. These molds yield castings about 3 mm thick.

The casting molds were placed in an air oven, which was heated rapidly to 58° C., held constant for 15 hours, heated to 120° C. over 4.25 hours and finally held constant for a further hour at 120° C.

When the molds were removed from the oven, the casting made using polymer #1 (pure PMMA) was seen to be cloudy. Castings using polymers 2, 3 and 4 were clear, but that from polymer 4 adhered to the glass plates and could not be demolded.

EXAMPLE 3

Preparation of an MMA-AMA copolymer using a higher monomer concentration than that in Example 1

The polymerization was carried out in a sealed 1.5 liter reactor equipped with internal heater and magnetic stirrer. The following reactant/solvent quantities were used.

| | |
|---|---|
| Toluene | 600 ml |
| MMA | 294 g |
| AMA | 6 g |
| Lauroyl peroxide | 25 g |
| t-butyl peroctoate | 10 g |

The initiators were dissolved in a minimum amount of the toluene. The remainder of the solvent and monomers was rapidly heated to 80° C. in a covered beaker with constant stirring. The hot monomer/solvent solution was added to the reactor and the initiator solution added. The reactor was flushed with nitrogen and capped before starting the stirrer. The reactor thermostat was set at 95° C., no provision for cooling to dissipate the exotherm was made. The temperature rose to 135° C. in 5 minutes, resulting in a pressure buildup of 60 psi (gauge). After 1 hour the temperature had dropped to 95° C. and the reaction was held at this temperature for a further 2 hours. The polymer solution was allowed to cool before running slowly into a large excess of cooled heptane; the precipitated polymer was dried under vacuum. The molecular weight of this copolymer ($M_v$) was found to be ~10,800.

EXAMPLE 4

Comparison of properties of castings containing 20 wt.% of the polymer from Example 3 with those of pure ADC castings Two casting solutions were prepared.
A: ADC (20 g) + di-sec. butyl peroxydicarbonate (0.688 g)
B: ADC (16 g) + polymer from Example 3 (4 g) + di-sec. butyl peroxydicarbonate (0.551 g)
The casting solutions were charged to molds of the type described in Example 2. The cure cycle (in an air oven) was as follows:

| Time hours | Temp °C. | Time hours | Temp °C. |
|---|---|---|---|
| 0.5 | 55 | 23.5 | 72 |
| 1.0 | 58 | 24 | 78 |
| 1.5 | 60 | 24.5 | 85 |
| 17.5 | 62 | 25 | 92 |
| 19.5 | 64 | 26 | 109 |
| 23 | 66 | 27.5 | 120 |

The properties of the casting are detailed in Table 2.

Table 2

| Casting | Density of casting solution g ml$^{-1}$ | Density of casting g ml$^{-1}$ | Shrinkage[1] % | Refractive index of casting | Barcol[2] hardness |
|---|---|---|---|---|---|
| A | 1.1428 | 1.3043 | 12.37 | 1.4971 | 34–32 |
| B | 1.1517 | 1.2222 | 5.77 | 1.4964 | 43–38 |

[1]calculated as: $\frac{(100 - \text{density of casting solution})}{\text{density of casting}} \times 100$

[2]measured using a Barcol impression (Barber-Colman °C., Rockford, Illinois); the two values given are the initial reading, and that obtained after 15 seconds.

The values in Table 2 show that the addition of 20% of the MMA/AMA copolymer reduces shrinkage to an even greater extent than would have been predicted by simple elimination of 20% of the monomer. At the same time the casting is harder and the refractive index is little changed; this is important as ADC castings are often used in optical applications. The large reduction in shrinkage will also reduce premature separation of the casting from the mold wall. This is a major cause of reject parts in ADC casting operations.

EXAMPLE 5

Viscosities of solutions of polymer from Example 3 in ADC

Viscosities were measured at 25° C. using an Ostwald S-200, 1001 viscometer. The viscometer was calibrated with aniline, then the expression $$\frac{\eta_1}{\eta_2} = \frac{\rho_2 T_1}{\rho_2 T_2}$$

was used to calculate the viscosities of the polymer solutions where:
$\eta_1$ is the viscosity of aniline (3.71 cp.)
$\rho_1$ is the density of aniline
$T_1$ is the flow time for aniline
$\eta_2$ $\rho_2$ and $T_2$ are the same values for the polymer solution.

Using the above technique the results in Table 3 were obtained.

Table 3

| weight % copolymer in ADC | viscosity cp. |
|---|---|
| 10 | 130 |
| 20 | 413 |
| 30 | 3128 |

For this particular copolymer in ADC, solutions containing more copolymer than 30 wt% would be difficult to charge to molds as the high viscosity would encourage formation of trapped air bubbles.

EXAMPLE 6

Preparation of MMA/AMA copolymers with higher allyl contents

The polymerizations were conducted in screw capped bottles which were flushed with nitrogen before capping. Polymerization was effected by immersing the bottles in an oil bath at 70° C. After 3¾ hours the bottles were removed and the polymers precipitated from heptane and filtered off. The isolated polymers were dried under vacuum.

The polymerization solutions and yields are detailed in Table 4.

Table 4

| Polymer | 1 | 2 | 3 |
|---|---|---|---|
| Toluene | 120 | 120 | 120 |
| AMA (g) | 6 | 9 | 14 |
| MMA (g) | 15 | 11 | 6 |
| t-butyl peroxypivalate (g) | 5 | 5 | 5 |
| yield (g) | 16.5 | 15.8 | 15.3 |

EXAMPLE 7

Preparation of an MMA/AMA/maleic anhydride (MAH) terpolymer

Reactants/solvent are detailed below.

| Toluene | 60 ml |
|---|---|
| AMA | 0.54 g |
| MMA | 30 g |
| MAH | 6 g |
| Lauroyl peroxide | 8 g |

The polymerization was conducted in screw capped bottles as described in example 6. The polymerization was continued for three hours at 85° C. before isolating the polymer by precipitation from cooled heptane. The precipitated polymer was filtered off and dried under vacuum.

EXAMPLE 8

Preparation of castings from pure ADC and from samples containing polymers from Example 3 and from Example 7

Three casting solutions were prepared.
A: ADC (100 g) + di-sec. butyl peroxydicarbonate (3.63 g)
B: ADC (80 g) + polymer from Example 3 (20 g) + di-sec. butyl peroxydicarbonate (2.9 g)

C: ADC (80 g)+polymer from Example 7 (20 g)+di-sec. butyl peroxydicarbonate (2.9 g)

Each solution was filtered before preparation of several castings from each. The molds were charged by the technique described in Example 2. Once again castings of about 3 mm thickness were prepared.

The castings were cured in a hot air oven using the following time temperature profile.

| Temp. °C. | Time duration at that temp.(mins) |
|---|---|
| 55 | 60 |
| 58 | 60 |
| 60 | 15 |
| 62 | 15 |
| 64 | 15 |
| 66 | 30 |
| 68 | 15 |
| 70 | 15 |
| 72 | 15 |
| 75 | 15 |
| 78 | 15 |
| 82 | 15 |
| 85 | 15 |
| 90 | 15 |
| 95 | 30 |

All of the castings were optically clear. Barcol hardnesses (as defined in Example 4) were measured; the results are detailed in Table 5.

Table 5

| Casting | Barcol hardness |
|---|---|
| (A) Pure ADC | 35-30 |
| (B) ADC plus polymer from example 3 | 37-32 |
| (C) ADC plus polymer from Example 7 | 30-27 |

EXAMPLE 9

Dyeing of castings from Example 8

Castings such as these are often used in spectacle lenses and are frequently tinted, hence tests on dye uptake were conducted.

This dye used was "Dip'N Tint" Fashion Dye #8 manufactured by American Optical Co. A solution of 1.3 g of this material in 946 ml of distilled water was prepared. The dye solution was used at 93° C., the castings were dyed by suspending them in the hot dye by use of fine wires passed through small holes drilled in the edge of the castings. The hardness of the castings was measured before and after dyeing times of 1 minute and 26 minutes. Light transmission of the castings at a wavelength of 560 mm. was measured by use of a Beckman Acta MIV spectrometer. Results are detailed in Table 6.

Table 6

| | | 1 Minute dyeing | | 26 minutes dyeing | |
|---|---|---|---|---|---|
| Casting | Initial Barcol Hardness | Barcol Hardness after dyeing | Light Transmission % | Barcol Hardness after dyeing | Light Transmission % |
| A(pure ADC) | 35-30 | 37-32 | 66.7 | 28-22 | 16.7 |
| B(ADC + polymer from Example 3) | 37-32 | 37-30 | 51.0 | 25-13 | 3.2 |
| C(ADC + polymer from Example 7) | 30-27 | 32-22 | 42.6 | 10-3 | 1.0 |

All the castings dyed evenly. As can be seen the tendency of the copolymer containing ADC samples to soften in the dyebath is offset by their stronger dye uptake which would allow shorter dyeing times.

EXAMPLE 10

Preparation of an ADC solution of an MMA/AMA copolymer without isolation of the latter Preparation of the copolymer.
Reactants/solvent are detailed below:

| Toluene | 2400 ml |
|---|---|
| AMA | 72 g |
| MMA | 1128 g |
| di (isopropyl) peroxydicarbonate* | 52 g |

*LUPEROX IPP made by Lucidol Div., Pennwalt Corp.

The polymerization was conducted in a three necked round bottom flask equipped with nitrogen inlet, thermometer and reflux condenser. The flask was immersed in an oil bath maintained at 60° C. and nitrogen was bubbled through the solution during the whole of the polymerization. The reaction was continued for 3 hours, although subsequent experiments have shown that the polymerization is complete in less than 1 hour.

Transfer of the copolymer into ADC.

A portion of the copolymer solution (2896 g) was blended with ADC (3600 g). The toluene was then stripped off using a vacuum rotary evaporator at 100° C. to leave a solution of the copolymer in ADC. The solution was cooled to room temperature before being filtered three times by gravity through a 0.45 $\mu$ fluted paper filter (Filterite brand).

EXAMPLE 11

Preparation of castings from the solution of Example 10 and from plain ADC

Two casting solutions were prepared:

| No. 1 | ADC | 130 g |
|---|---|---|
| | di(sec.butyl) peroxydicarbonate | 4.775 g |
| No. 2 | Solution from Example 10 | 130 g |
| | di(sec.butyl) peroxydicarbonate | 3.8204 g |

The solutions were charged to 0.25 inch molds by the technique described in Example 2. Three castings were prepared for each solution. The cure cycle, in an air oven, was as follows:

| Time hrs. | Temp. °C. |
|---|---|
| 0 | 40 |
| 0.5 | 55 |
| 1.0 | 60 |
| 2.0 | 63 |
| 3.0 | 68 |
| 3.5 | 74 |
| 4.0 | 80 |
| 4.5 | 88 |
| 5.0 | 92 |
| 6.0 | 92 |
| 6.75 | 100 |
| 7.25 | 100 |

All of the pure ADC castings cracked during the cure cycle but those from the copolymer solution of Example 10 were clear hard and crack free. This example demonstrates that copolymer containing solutions of ADC can be subjected to more rapid cure cycles than pure ADC.

Preparation of methylmethacrylate (MMA)-Styrene-Allylmethacrylate (AMA) copolymer The copolymer was prepared by solution polymerization in toluene. The monomers and solvent in the amounts given below were charged into a fourneck, 1 liter flask immersed in a 61° C. water bath. The flask was equipped with a thermometer, $N_2$ purge and a reflux condensor. The diisopropyl peroxydicarbonate was added when the solution equilibrated to bath temperature. Nitrogen was bubbled through this mixture during the whole of the polymerization. After 38 minutes the bath temperature was increased to 70° C. Cooling the flask to room temperature, stopped the reaction at 168 minutes at which point the conversion was in excess of 99%. Looking through the flask this copolymer-toluene solution appeared to be crystal clear.

Reactants

| Reactants | |
|---|---|
| Allyl methacrylate | 18 g |
| Methyl methacrylate | 251.5 g |
| Styrene | 30.72 g |
| Toluene | 400 mls |
| Diisopropyl peroxydicarbonate | 13 g |

A casting solution consisting of 20% by weight of (MMA/styrene/AMA) copolymer in ADC was prepared in the following manner. A homogeneous mixture, comprising 107.75 grams of copolymer-toluene solution and 200 g of ADC monomer, was added to a single neck round bottom flask. Assuming 100% conversion for the solution polymerization; 107.75 grams of the copolymer-toluene solution contained 50 grams of copolymer. The toluene was removed or stripped out of solution by attaching the flask to a roto-evaporator, immersing it in a 110° C. oil bath and applying a vacuum.

EXAMPLE 13

Preparation of castings from the solution of Example 12 and from plain ADC

The two casting solutions given here were used to prepare 0.50 inch thick sheets.

| No. 1 | ADC | 80 g |
|---|---|---|
| | Diisopropyl peroxydicarbonate | 2.40 g |
| No. 2 | Solution from Example 12 | 80 g |
| | Diisopropyl peroxydicarbonate | 1.92 g |

Casting molds were formed from two clean dust free sheets of tempered glass separated by a flexible polyvinylchloride gasket. The molds were held together with spring binder clips. These solutions were injected into the molds using a syringe, a second syringe needle was needed to allow displaced air to escape. The filled molds were placed in a cam controlled mechanically convected air oven, and subjected to the following cure cycle.

| Time hrs. | 0 | 3.0 | 7.5 | 10.5 | 11.0 | 12.25 |
|---|---|---|---|---|---|---|
| °C. | 38 | 45 | 46 | 47.5 | 48 | 49 |
| Time hrs. | 15.25 | 16.25 | 18.0 | 18.75 | 19.0 | 20.0 |
| | 52 | 54 | 55 | 57 | 60 | 70 |
| Time hrs. | 21.0 | 21.5 | 22 | 23 | | |
| | 87 | 97 | 90 | 70 | | |

All of the castings were optically clear and hard. When the 0.50 inch thick samples were placed on a layer of white paper, the sheet prepared from solution No. 2 appeared more water-white than cured plain ADC. Holding both samples on edge, it was obvious that plain cured ADC had a comparatively light yellow hue. Therefore, the copolymer not only reduces the shrinkage of ADC, but improves the color as well.

What is claimed is:

1. A composition consisting essentially of 25 to 99 percent by weight of diethylene glycol bis(allyl carbonate) monomer, and
   1 to 75 percent by weight of a copolymer having a molecular weight of 1,000 to 100,000 prepared by reacting
   (i) at least one allyl ester, substituted allyl ester, N-allyl substituted amide or N-N-diallyl substituted amide of an α-B unsaturated carboxylic or dicarboxylic lic acid; or an allyl substituted monovinyl aromatic compound.
   (ii) at least one lower alkyl methacrylate, optionally together with a minor amount of one or more vinyl or vinylidene monomers which are polymerizable by a free radical mechanism.

2. A composition consisting essentially of 25 to 99 percent by weight of diethylene glycol bis-(allyl carbonate) monomer,
   1 to 75 percent by weight of a copolymer having a molecular weight of 1,000 to 100,000 prepared by reacting
   (i) at least one compound having the formula

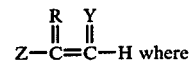

where Z is

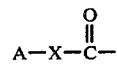

or A-$R_4$ where $R_4$ is aryl of 6 to 15 carbons;
When Z is A-$R_4$, Y is hydrogen and R is hydrogen or $CH_3$—;
When Z is

Y is hydrogen or

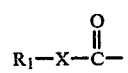

and R is hydrogen, $CH_3$—, or where A is

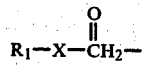

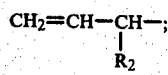

$R_2$ is hydrogen or $CH_3$; X is —O— or

$R_3$ is A, hydrogen, alkyl of 1 to 10 carbons, aryl of 6 to 12 carbons, cycloalkyl of 3 to 12 carbons or aralkyl of 7 to 15 carbons;
$R_1$ is A or $R_3$ with the proviso that when Y is

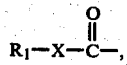

R is hydrogen and when R is

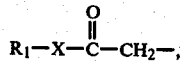

Y is hydrogen; and
(ii) at least one lower alkyl methacrylate, optionally together with a minor amount of one or more monomers selected from: α-β unsaturated carboxylic or dicarboxylic acids, their esters or anhydrides, vinyl aromatics, dienes, vinyl esters, vinyl chloride, vinylidene chloride, acrylonitrile or methacrylonitrile.

3. The composition of claim 2 wherein the copolymer is methyl methacrylate-allyl methacrylate copolymer.

4. The composition of claim 2 wherein the copolymer is methyl methacrylate-allyl methacrylate-maleic anhydride terpolymer.

5. The composition of claim 2 wherein the copolymer is methyl methacrylate-allyl methacrylate-styrene terpolymer.

6. The composition of claim 2 wherein
(i) is at least one of the members selected from the group consisting of allyl methacrylate, allyl itaconate, diallyl itaconate, allyl acrylamide, diallyl acrylamide, allyl maleate, diallyl maleate, allyl fumarate and diallyl fumarate.

7. The composition of claim 2 wherein
(ii) is a lower alkyl methacrylate, optionally together with a minor amount of one of the members selected from the group consisting of styrene, vinyl toluene, p-methoxystyrene, vinyl cyclohexane, chloro-, fluoro- or bromo styrene, vinyl chloride, vinylidene chloride, tetrafluoroethylene, acrylic acid, methacrylic acid, vinyl acetate, vinyl propionate, vinyl stearate, isoprene, butadiene, chloroprene, maleic anhydride, acrylonitrile and methacrylonitrile.

8. A process for the preparation of a casting comprising curing the composition of claim 2.

9. The optical clear, reduced shrinkage, product prepared by the process of claim 8.

* * * * *